(12) United States Patent
Sfar

(10) Patent No.: US 9,066,272 B2
(45) Date of Patent: Jun. 23, 2015

(54) METHOD AND DEVICE FOR ASSIGNING A CELL TO A WIRELESS COMMUNICATION APPARATUS, AND CORRESPONDING APPARATUS

(75) Inventor: Safouane Sfar, Le Mans (FR)

(73) Assignee: ST Ericsson (France) SAS, Grenoble (FR)

( * ) Notice: Subject to any disclaimer, the term of this patent is extended or adjusted under 35 U.S.C. 154(b) by 964 days.

(21) Appl. No.: 13/133,906

(22) PCT Filed: Dec. 1, 2009

(86) PCT No.: PCT/EP2009/066123
§ 371 (c)(1),
(2), (4) Date: Dec. 29, 2011

(87) PCT Pub. No.: WO2010/066607
PCT Pub. Date: Jun. 17, 2010

(65) Prior Publication Data
US 2012/0108236 A1    May 3, 2012

(30) Foreign Application Priority Data
Dec. 12, 2008  (FR) ...................... 08 58536

(51) Int. Cl.
*H04W 72/00* (2009.01)
*H04W 36/22* (2009.01)
(Continued)

(52) U.S. Cl.
CPC .............. *H04W 36/22* (2013.01); *H04W 36/26* (2013.01); *H04W 48/20* (2013.01)

(58) Field of Classification Search
USPC .......................................... 455/434, 464, 62
See application file for complete search history.

(56) References Cited

U.S. PATENT DOCUMENTS

| 7,177,649 B1 * | 2/2007 | Nielsen ........................ 455/453 |
| 2004/0125769 A1 * | 7/2004 | Vare .............................. 370/331 |
| 2008/0227453 A1 * | 9/2008 | Somasundaram et al. .... 455/436 |

FOREIGN PATENT DOCUMENTS

| EP | 1503606 A1 | 2/2005 |
| EP | 1686821 A1 | 2/2006 |

(Continued)

OTHER PUBLICATIONS

Rapport De Recherche Preliminaire; Institut National de la Propriete Industrielle (French Search Report); J. Schweitzer; Aug. 3, 2009, 2 pages.

(Continued)

*Primary Examiner* — Justin Lee
(74) *Attorney, Agent, or Firm* — Howison & Arnott, LLP

(57) ABSTRACT

A method and device for assigning a cell to a wireless communication apparatus, and corresponding apparatus is provided. The method for assigning a cell to a wireless communication apparatus is performed when the wireless communication device leaves a standby mode so as to send a request for access to a desired service belonging to a class of services. The method may include elaborating, for each cell and for each class of service supported by the cell, an index relating to the loading rate of the class of services within the cell. The communication apparatus may then receive the loading rate indices of the cells liable to be assigned to the communication apparatus. The communication device then may select, from among the cells liable to be assigned to the communication apparatus, the cell to which the communication apparatus is assigned, at least, as a function of the loading rate indices.

6 Claims, 10 Drawing Sheets

(51) Int. Cl.
*H04W 36/26* (2009.01)
*H04W 48/20* (2009.01)

(56) References Cited

FOREIGN PATENT DOCUMENTS

| EP | 2056609 | A1 | 6/2009 |
| WO | 0232160 | A2 | 4/2002 |
| WO | 2008/023609 | A1 | 2/2008 |
| WO | 2008/052066 | A2 | 5/2008 |

OTHER PUBLICATIONS

Patent Cooperation Treaty International Search Report and Written Opinion for PCT/EP2009/066123; Feb. 25, 2010; 9 pages.

* cited by examiner

FIG.7

| QCIX | Bandwidth consumed by a service belonging to the class QCI expressed in relation to the total bandwidth of the cell | Maximum percentage of the bandwidth accorded to each of the class QCI | Multiplication | Sorting according to the largest result in the multiplication for a cell | Parameter Alpha |
|---|---|---|---|---|---|
| QCI1 | 0.1% | 5% | 0.5% | 9 | 9 |
| QCI2 | 3% | 10% | 30% | 2 | 2 |
| QCI3 | 0.5% | 20% | 10% | 5 | 5 |
| QCI4 | 0.08% | 15% | 1.2% | 8 | 8 |
| QCI5 | 5% | 3% | 15% | 4 | 4 |
| QCI6 | 2% | 2% | 4% | 7 | 7 |
| QCI7 | 1% | 10% | 10% | 5 | 5 |
| QCI8 | 1.7% | 25% | 37.5% | 1 | 1 |
| QCI9 | 2.5% | 10% | 25% | 3 | 3 |

FIG.9

| QCIX | Bandwidth consumed by a service belonging to the class QCI expressed in relation to the total bandwidth of the cell | Parameter Beta |
|---|---|---|
| QCI1 | 0.1% | 8 |
| QCI2 | 3% | 2 |
| QCI3 | 0.5% | 7 |
| QCI4 | 0.08% | 9 |
| QCI5 | 5% | 1 |
| QCI6 | 2% | 4 |
| QCI7 | 1% | 6 |
| QCI8 | 1.7% | 5 |
| QCI9 | 2.5% | 3 |

FIG.11

| QCI | Example of services |
|---|---|
| 1 | Conversationnel |
| 2 | Conversationnel |
| 3 | Streaming |
| 4 | Streaming |
| 5 | Interactive service |
| 6 | Interactive service |
| 7 | Interactive service |
| 8 | Interactive service |

METHOD AND DEVICE FOR ASSIGNING A CELL TO A WIRELESS COMMUNICATION APPARATUS, AND CORRESPONDING APPARATUS

CROSS-REFERENCE TO RELATED APPLICATIONS

This application is a U.S. National Phase application submitted under 35 U.S.C. §371 of Patent Cooperation Treaty application serial no. PCT/EP2009/066123, filed Dec. 1, 2009, and entitled METHOD AND DEVICE FOR ASSIGNING A CELL TO A WIRELESS COMMUNICATION APPARATUS, AND CORRESPONDING APPARATUS, which application claims priority to French patent application serial no. 08 58536, filed Dec. 12, 2008, and entitled PROCEDE ET DISPOSITIVE D'AFFECTATION D'UNE CELLULE A UN APPAREIL DE COMMUNICATION SAND FIL, ET APPAREIL CORRESPONDANT.

Patent Cooperation Treaty application serial no. PCT/EP2009/066123, published as WO2010/066607, and French patent application serial no. 08 58536, are incorporated herein by reference.

TECHNICAL FIELD

The present invention relates to the field of wireless communication, in particular wireless networks termed 3G UMTS and LTE (Long Term Evolution), and more particularly the assigning of a cell to a wireless communication apparatus for the execution of a desired service.

BACKGROUND OF THE RELATED ART

In the LTE standard in particular, upon access to the service of a wireless communication apparatus, the assignment of a cell is performed for the services of the wireless communication apparatus according to a criterion termed "criterion S" well known to the person skilled in the art and which takes into account the quality of signal reception.

SUMMARY OF THE INVENTION

According to one mode of implementation and embodiment, it is proposed that a cell be selected so as to obtain a better quality of service. Thus a selected cell will be able, if appropriate, to offer a wider bandwidth for the execution of the service requested by a user.

According to one aspect there is proposed a method for assigning a cell to a wireless communication apparatus leaving a standby mode so as to send a request for access to a desired service belonging to a class of services.

According to this aspect an index relating to the loading rate of the said class of services within the cell is elaborated for each cell and for each class of service supported by the said cell; the communication apparatus receives the said loading rate indices of the cells liable to be assigned to the communication apparatus and, at least as a function of the said loading rate indices, a selection of the cell to be assigned is made from among these cells liable to be assigned to the communication apparatus.

Thus, for example, the higher the loading rate index, for example the closer it is to 1 if it is considered that this index varies between 0 and 1, the more the cell will exhibit bandwidth available for the execution of the desired service. Conversely, the lower the loading rate index is, for example the closer it is to zero, the more beneficial it is to select another cell for the execution of the service in order to ensure good quality of service.

The control of access as a function of the classes of services is established at the lowest level of the network. Thus, on the one hand, this avoids a useless connection to the base station while the service could not be provided under good conditions. And, on the other hand, it allows better quality for certain services by limiting the number of connections to a base station for other services.

According to one mode of implementation, within the apparatus, an index of quality of signal reception by the apparatus is associated with each cell and the cell to be assigned is also selected as a function of these reception quality indices.

The use of an additional criterion of reception quality makes it possible, because of the dispersion of the reception quality as a function of the positioning of the terminals, to prevent all the terminals from choosing the same cell.

According to one mode of implementation, in the course of the selection step, within the apparatus, a random number is drawn, the cell exhibiting the best index of reception quality and also satisfying a criterion of comparison between the said random number and the loading rate index of this cell for the class of services containing the desired service is selected.

Thus, for example, it will be considered that the comparison criterion is satisfied if the random number is less than the said loading rate index. Such a mode of implementation makes it possible, by drawing a random number within each apparatus, to reduce the risk of clogging of a cell if several apparatuses are liable to access this same cell.

According to one mode of implementation, the selection step is repeated until a cell is actually selected.

According to one mode of implementation, the cell with which the selection could not be established because of the non-satisfaction of the comparison criterion is excluded temporarily from the cells liable to be selected.

This makes it possible in particular not to run the risk of blocking the system in the presence of a cell exhibiting at one and the same time the best quality index and a very low loading rate index.

According to another aspect, there is proposed a device for assigning a cell to a wireless communication apparatus, this device comprising:

control means able to switch this apparatus from a standby mode to a mode of sending a request for access to a desired service belonging to a class of services, reception means able to receive from the cells liable to be assigned to the communication apparatus indices relating to the loading rates of all the classes of services of all these cells liable to be assigned to the communication apparatus, and processing means comprising selection means able to select the cell to be assigned at least as a function of the said loading rate indices.

According to one embodiment, the processing means comprise means for determining the quality of reception of the signal of each of the various cells and the selection means are able to select the cell to be assigned also as a function of the said reception quality indices.

According to another embodiment, the selection means comprise means for generating a random number, comparison means able to compare this random number and a loading rate index and the selection means are configured so as to select the cell exhibiting the best index of quality and for which the result of the said comparison also satisfies a comparison criterion.

According to another embodiment, the selection means furthermore comprise means able to temporarily exclude the cell with which the selection could not be established because of the non-satisfaction of the said comparison criterion.

According to another aspect, there is proposed a wireless communication apparatus, incorporating an assignment device such as defined previously.

BRIEF DESCRIPTION OF THE DRAWINGS

Other advantages and characteristics of the invention will be apparent on studying the detailed description of modes of implementation and embodiments, taken by way of nonlimiting examples and illustrated by the appended drawings in which:

FIGS. 7 to 10 illustrate two examples of calculating loading rate indices; and

FIG. 11 illustrates classes of services of the LTE standard and the types of services which are assigned to them according to the ranking of the LTE standard (TS 23.401).

DETAILED DESCRIPTION

Figure 1:
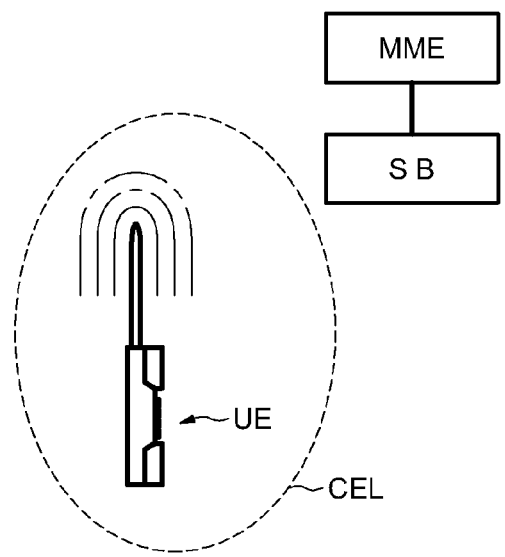
FIG. 1 schematically illustrates a mobile network.

An application of the invention to a 3G or LTE network will now be described. FIG. 1 schematically represents the main terminating elements of a mobile network, namely a base station SB also called NodeB or eNodeB (according to nomenclature well known to the person skilled in the art) and a wireless communication apparatus UE, for example a cellular mobile telephone.

The base station SB connects the communication apparatus UE up to the network and is for this purpose in charge of several cells one of which, referenced CEL, is schematically represented in FIG. 1. These cells are in fact transmission frequencies In the LTE or 3G standard, there exist inter alia two types of operating modes for the communication apparatus UE while it is turned on, namely the standby or idle mode and the connection mode when a connection of RRC (Radio Resource Control) type is established.

When switching from a standby mode to a connection mode a cell CEL is assigned to the communication apparatus. This cell CEL can change during a shift of location, this change called a "handover" is managed in general by a specific entity called an MME (Mobility Management Entity according to nomenclature well known to those skilled in the art) or VLR MSC in the 3G standard (Visitor Location Register, Mobile Switching Centre according to nomenclature well known to those skilled in the art).

According to one aspect, the invention embodiments relate to the switching from the standby mode to the connected mode and the assigning of the cells in the course of this step.

Thus, before switching to connection mode the communication apparatus UE sends a request for admittance to the service, then a cell is assigned to it and the traffic of the service travels via this cell.

It is proposed here to select a cell for the service, which the user of the communication apparatus wishes to access by taking account, at least, of a parameter related to the traffic of the cell.

In the embodiment and mode of implementation described, an index relating to the loading rate or access factor referenced QAF is calculated and dispatched by the base stations, and then, after reception of this index, the wireless communication apparatus we will use it to select a cell.

Figure 2:
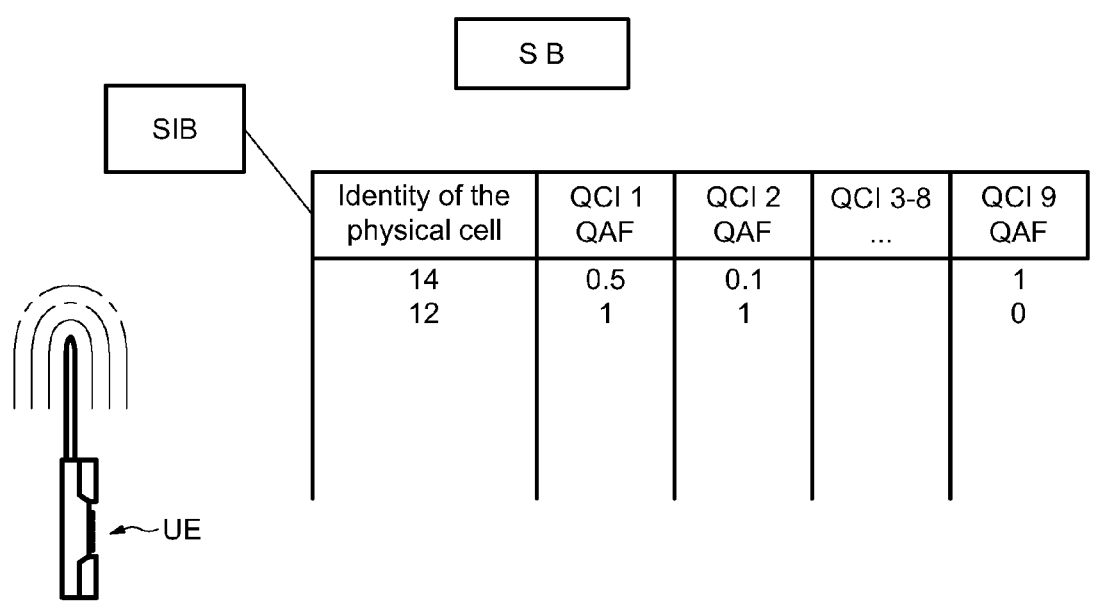
FIG. 2 illustrates an exemplary transmission of indices relating to the loading rate.

In FIG. 2, an array is illustrated. Each cell liable to be assigned occupies a row therein. In each cell, for each class of service QCI an index QAF is associated. The QAF index is a positive rational number for example lying between 0 and 1, whose value relates to the loading of the class of service for the cell. Examples of elaborating the QAF indices will be detailed hereinafter. These indices can be transmitted from the base station to the communication apparatuses via a communication channel called SIB defined in the 3G and LTE standard and well known to the person skilled in the art.

As an example, classes of services illustrated in FIG. 11. Such classes of services may be cited as a class dedicated to streaming, that is dedicated to conversational streams or else that is dedicated to interactive services.

Figure 3:
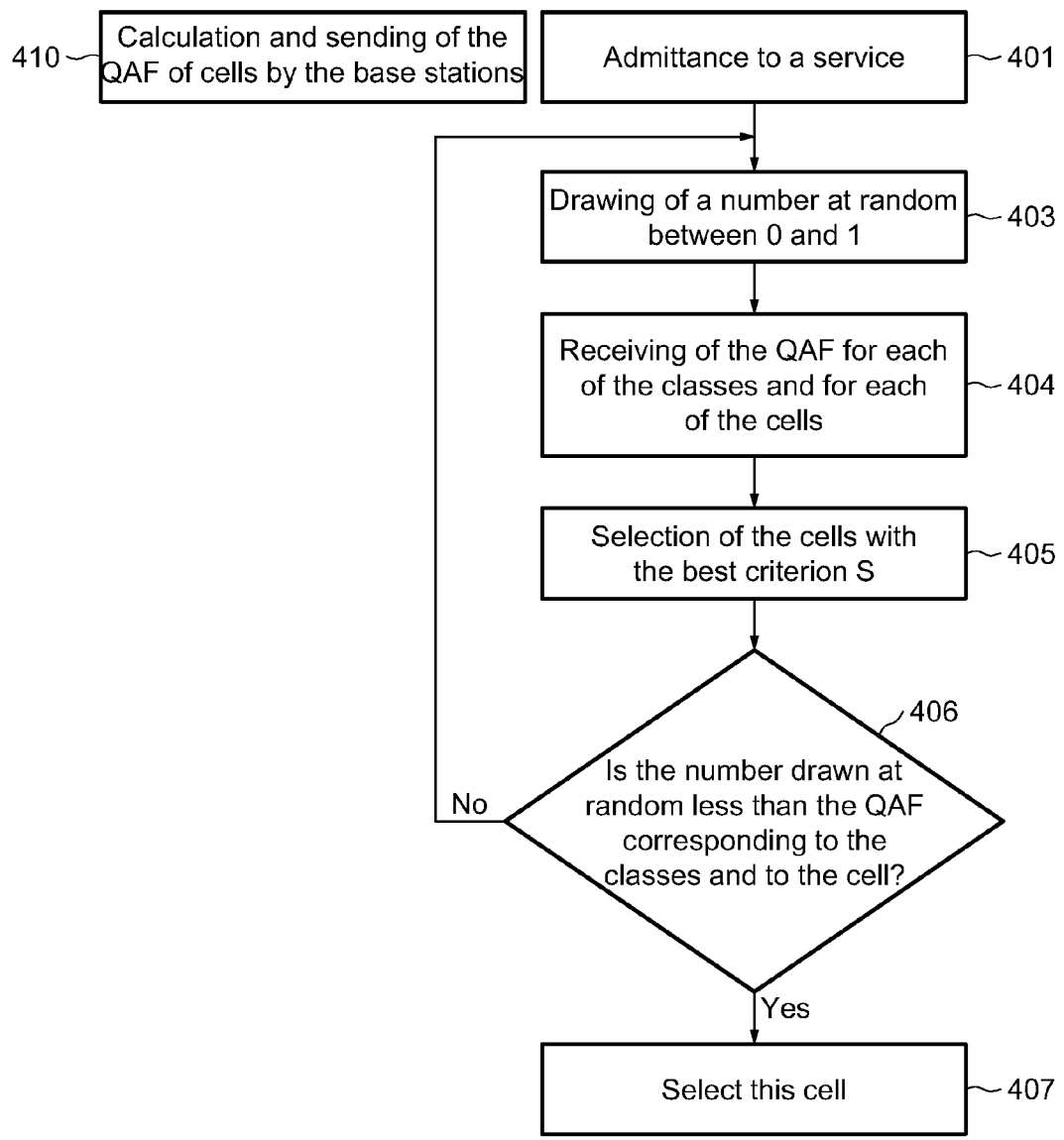
FIGS. 3 and 4 schematically illustrate two modes of implementation of the method according to the invention in the form of a flowchart of an algorithm for assigning the cell to the communication apparatus in accordance with an invention embodiment.

FIG. 3 describes a mode of implementation of a method in the course of which the wireless communication apparatus uses the index received that is related to the loading rate in order to select a cell. At the level of each base station, the associated QAF indices are elaborated (410) for each cell and for each class of service supported by the said cell. After the sending, by the apparatus, of a request for admittance to the desired service (401), the communication apparatus will select a cell for this service.

It draws a random number RAND, for example between 0 and 1 (403).

The QAF indices of each of the services on each of the cells are moreover received by the apparatus (404).

The apparatus also determines for each cell an index of quality of signal reception. By way of indication, it is possible to use the criterion S described in the standards TS 25.304 for 3G and TS 36.304 for LTE.

The cell exhibiting the best criterion S is then preselected (405). Next, for the cell and for the class of service corresponding to the desired service, the corresponding QAF index is compared (406) with the random number RAND generated during the previous step 403. If the comparison reveals that the random number is less than the QAF then the cell is selected (407) for the class of service corresponding to the desired service. Otherwise the selection process is repeated.

The choice of a random number to select the cell makes it possible to space out the connection times of the various terminals, a terminal being able to select its cell right from the first attempt while another will have to wait several attempts.

Figure 4:
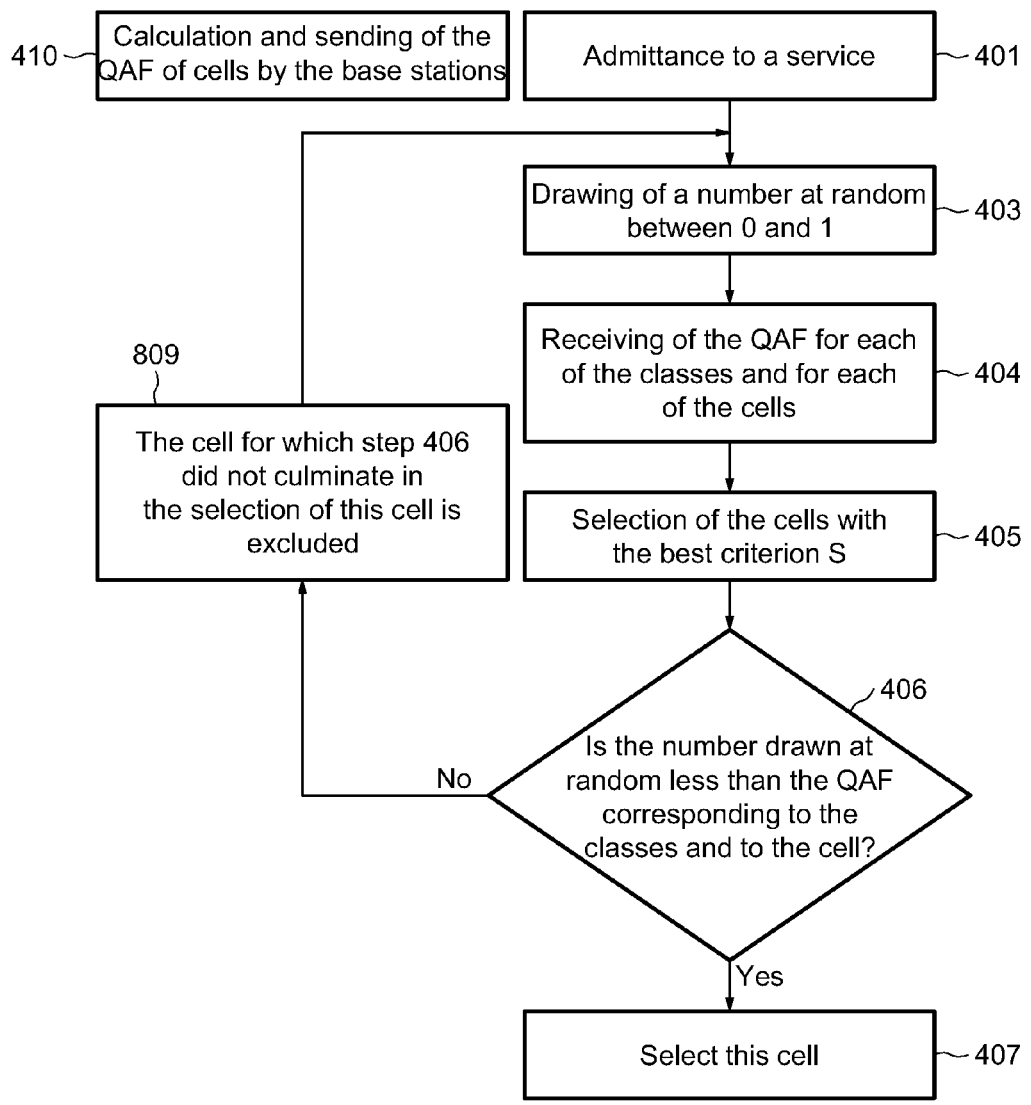

FIG. 4 illustrates a variant of the method which differs from that illustrated in FIG. 3 through the presence of step 809. This step 809 consists, when the comparison criterion is not satisfied 406, that is to say if the QAF index of the class of the cell with the best criterion S is not greater than the random number, of excluding this cell when the selection process is subsequently recommenced. Thus, the cell which will be chosen, if the reception conditions are unchanged, will be the second best according to the criterion S, if it complies with the conditions of random number less than the QAF.

The duration for which the cell is excluded can be configured in various ways and can depend on the class of service. According to a first version, the duration for which the cells are excluded can be fixed. According to a second version, the duration of exclusion can further be configured by the operator and dispatched by the base station via blocks SIB. Finally in a third version, the duration being specified, such that a Boolean in a block SIB indicates whether this duration does or does not have to be applied, for each of the cells.

Figure 5:
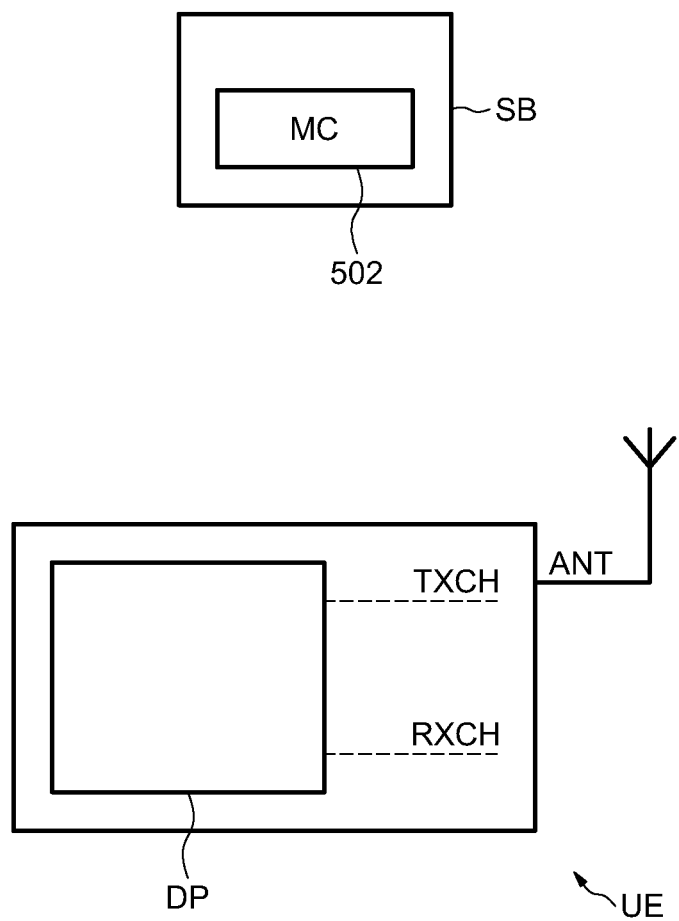
FIGS. 5 and 6 schematically illustrate an embodiment of a device according to invention embodiment.

FIG. 5 schematically illustrates embodiments of a base station and of a communication apparatus according to the invention.

As may be seen in the top part of FIG. 5, the base station SB comprises means for calculating the QAF indices. These calculating means 502 can for example be software means. From a general point of view, the QAF index is a positive rational number. It is distinct for each cell and for each class of service. For example, for a base station which is in charge of two cells having three classes of services on each, the means for calculating the QAF will calculate six positive rational numbers, one per class of service and per cell. The calculation means 502 could also be situated further upstream in the network.

As represented in the bottom part of FIG. 5, the communication apparatus UE comprises an antenna ANT, a reception chain RXCH, a transmission chain TXCH, which are both connected to a digital processing stage DP.

The reception chain RXCH makes it possible to receive the QAF indices coming from the various base stations. The transmission chain TXCH makes it possible to send a request for access to the desired service.

Of course, the range of the mobile network is limited, the reception means process only the cells that are within range of the communication apparatus.

Figure 6:
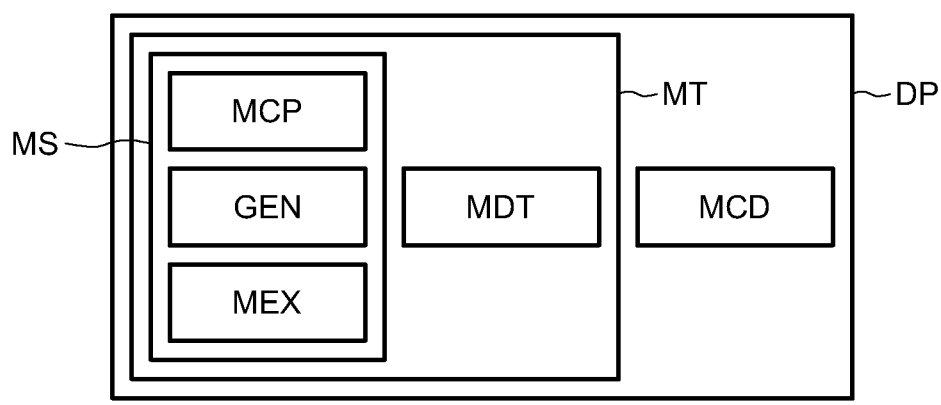

As illustrated in FIG. 6, the processing stage DP comprises control means MCD able to switch the apparatus from its standby mode to the connection mode for the sending of a request for access to the desired service.

In addition to these control means MCD, the processing stage comprises processing means MT.

The processing means MT comprise means MDT able to determine the quality of the signal received by each cell.

Selection means MS will perform the selection of the cell on the basis in particular of the QAF indices.

These selection means MS comprise comparison means MCP, a random number generator GEN and exclusion means MEX able to exclude a cell from the cells liable to be selected.

These means will make it possible to perform the steps illustrated in FIGS. 3 and 4.

All the means of the stage DP can be embodied for example in the form of software modules, or else for some of them in the form of logic circuits.

FIG. 7 illustrates a first mode of calculating the QAF indices for a cell.

The formula used here for a cell is $QAF=TRUNC[(1-(BandWidthOccupied/TotalBandWidth)\alpha)*10]/10$. The function TRUNC corresponds to the truncation function and extracts the integer part. The variable "BandWidthOccupied" represents the bandwidth occupied by the set of users and services on the cell. The variable "TotalBandWidth" represents the total bandwidth available on the cell. This formula makes it possible to obtain a QAF index that tends to a zero value when the traffic processed by the cell for the class of service considered attains its maximum.

Nevertheless, the coefficient alpha, which will be different for each of the classes of services QCIX, remains to be defined; it is the subject of the array illustrated in FIG. 7.

The first column corresponds for a given cell to all the classes of services supported by the cell.

The second column corresponds to the value as a percentage of the loading induced by a service belonging to the class of service of the first column. To ease this calculation, it is assumed that all the services of one and the same class of service consume the same bandwidth. Nevertheless, this is not in any way required.

The third column is a data item that the operator can modify. It corresponds to the maximum bandwidth that he wishes to accord to each of the service classes. It is expressed as a percentage with respect to the maximum bandwidth of the corresponding class of service.

In the fourth column, a multiplication on the preceding two columns is established. On the basis of this fourth column a ranking of the various classes of services is then deduced. The class of service having the highest multiplication result has the rank 1. The value of the rank for the other classes of service increases as the multiplication results decrease.

This ranking makes it possible to deduce the value of alpha. The value alpha corresponds, in fact, directly to the rank of the classes of services (column four). Thus, a value alpha equal to 1 will be allocated to the class of service QCI8 of rank 1. It is apparent that then in the above formula the value of the QAF index increases as alpha decreases, thereby corresponding to a higher probability of assignment of this class of service for this cell.

Figure 8:
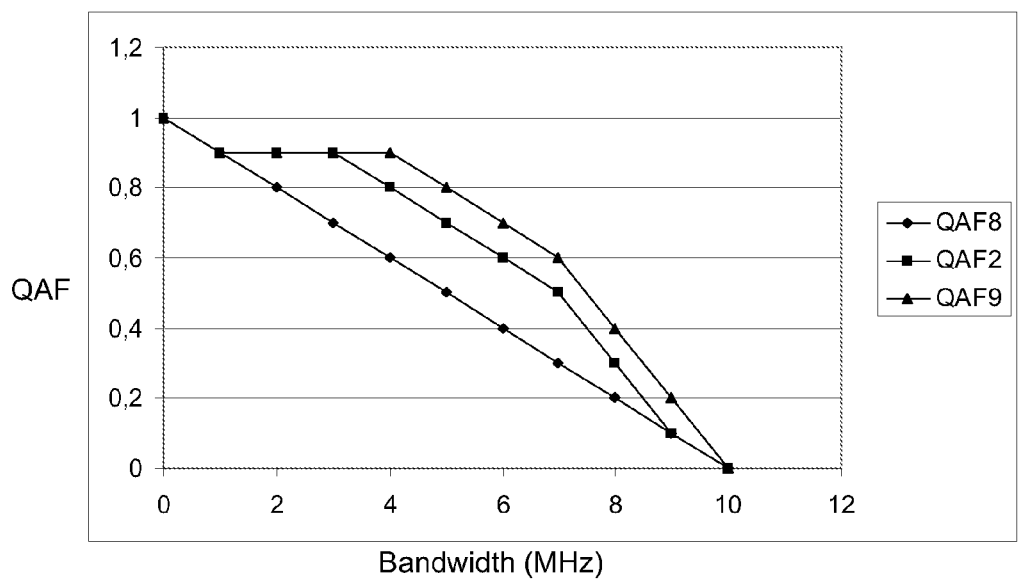

FIG. 8 illustrates an exemplary evolution of the QAF index values for the classes of services 8, 2, and 9 calculated in accordance with the mode of calculation illustrated by FIG. 7. Represented as ordinate is the value of the QAF index and as abscissa the total bandwidth (expressed in Mb/s) consumed by a cell whose maximum bandwidth is 10 Mb/s. In accordance with what is required to ensure good control of access, the QAF values all tend towards a zero value as the total traffic processed by the cell tends towards the maximum traffic that the cell can process.

FIG. 9 illustrates a second mode of calculating the QAF. Here again for reasons of ease of calculation the bandwidth consumed by each of the services belonging to one and the same class of service is considered to be equal. The formula used in this case is $QAF=TRUNC([1-(\beta+1)\hat{}((BandWidthOccupied-TotalBandWidth)/TotalBandWidth)]*100)/100$ in which the notation $\hat{}$ represents the "power" function. The variables and functions have the same meanings as in the previous formula illustrated in FIG. 7. Just like the formula illustrated in FIG. 7, the QAF of all the classes of service tends towards 0 as the bandwidth occupied tends towards the total bandwidth.

The factor beta depends directly on the bandwidth occupied by the desired service in relation to the total bandwidth of the cell.

In the array of FIG. 9, as may be seen the first column represents the classes of services available for a cell.

The second column represents as a percentage the bandwidth consumed by the service of the class QCIX in relation to the total bandwidth of the cell.

The third column represents the factor beta based on the ranking in accordance with the maximum consumed bandwidth.

Stated otherwise, the class of service having the maximum consumed bandwidth has a factor beta equal to 1. And this factor increases as the value of the bandwidth consumed decreases.

Thus the services corresponding to the service class QCI5 consumes 5% of the total bandwidth of the cell and the services of the class of service QCI5 are therefore ranked first; their beta value is therefore 1. This value of beta does indeed correspond in the formula previously defined to a minimum QAF value. Thus, with this mode of calculation the services which are not very bandwidth greedy are favoured over the others.

Figure 10:
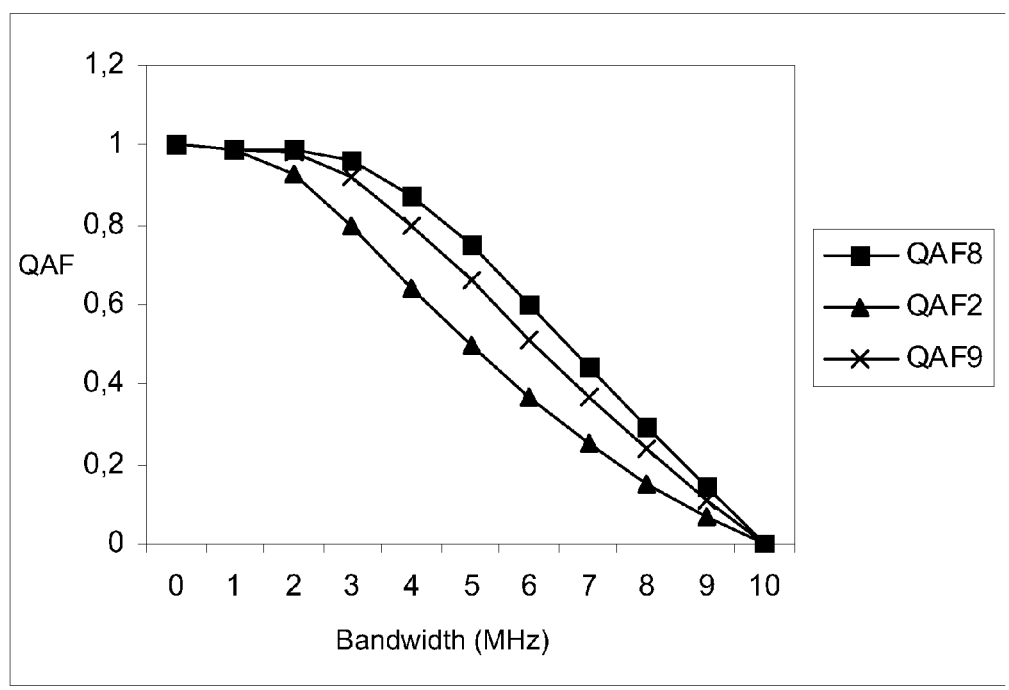

FIG. 10 illustrates an exemplary evolution of the QAF index values for the classes of services 8, 2, and 9 calculated in accordance with the mode of calculation illustrated by FIG. 9. The graphic represented is similar to that illustrated in FIG. 8. Here again in accordance with what is required to ensure good control of access, the QAF values all tend towards a zero value as the total traffic processed by the cell tends towards the maximum traffic that the cell can process.

The modes of calculation of the QAF index which are illustrated in FIGS. 7 to 10 can be applied within the framework of the 3G or LTE standards.

The invention makes it possible in particular to improve the quality of service through a temporal and geographical apportioning of the connections as a function of the classes of service on the cells. The invention is not limited to the modes of implementation and embodiments which have just been described but embraces all variants.

Thus, instead of using the criterion S for the preselection of the cells, it would be possible to favour the loading rate indices (with or without an additional criterion of reception quality), with optionally the use of a random number as indicated above. It would, in particular, be possible to rank the cells according to their QAF parameter and then to select the one exhibiting the best QAF parameter. This selection could also be refined through the use of the random number such as described previously and ultimately through the criterion S.

The invention claimed is:

1. A method for assigning a cell to a communication apparatus that is leaving a standby mode so as to send a request for access to a desired service belonging to a class of services, the method comprising:
    elaborating, for each cell and for each class of service supported by each cell, an index relating to a loading rate of each class of service within the cell;
    receiving, by the communication apparatus, the loading rate indices of each cell liable to be assigned to the communication apparatus;
    drawing a random number;
    associating, within the communication apparatus, an index of quality of signal reception for each cell liable to the assigned; and
    selecting, from among the cells liable to be assigned to the communication apparatus, a selected cell having a best index of quality of signal reception of the cells liable to be assigned and that also satisfies a criterion of comparison between the random number and the loading rate indices of the selected cell.

2. The method according to claim 1, wherein a non-selected cell that exhibited the best index of quality of signal selection, but was not selected as the selected cell because of a non-satisfaction of the comparison criterion is excluded temporarily from the cells liable to be assigned.

3. A device for assigning a cell to a wireless communication apparatus, the device comprising:
    a control block configured to switch the wireless communication apparatus from a standby mode to a mode of sending a request for access to a desired service belonging to a class of services;
    a reception chain configured to receive, from the cells liable to be assigned to the wireless communication apparatus, loading rate indices relating to loading rates of each of the classes of services for each of the cells liable to be assigned; and
    a processing block comprising;
        a random number generator for generating a random number;
        a reception quality index determination unit configured to determine reception quality indices for each of the cells liable to be assigned; and
        a selection unit configured to select a selected cell to be assigned to the wireless communication apparatus having a best determined reception quality index from among the cells liable to be assigned, and that also meets a comparison criterion between the random number and at least one of the loading rate indices related to the loading rates of each of the classes of services for each of the cells liable to be assigned.

4. A device according to claim 3, wherein the at least one of the loading rate indices related to the loading rates for the selected cell is for a class of services desired by the selected cell.

5. The device according to claim 3, wherein the selection unit is further configured to temporarily exclude, from the cells liable to be selected, a non-selected cell that was not selected because of a non-satisfaction of the comparison criterion.

6. The device for assigning a cell to a wireless communication apparatus of claim 3, wherein the wireless communication apparatus comprises the device.

\* \* \* \* \*